United States Patent Office 3,145,981
Patented Aug. 25, 1964

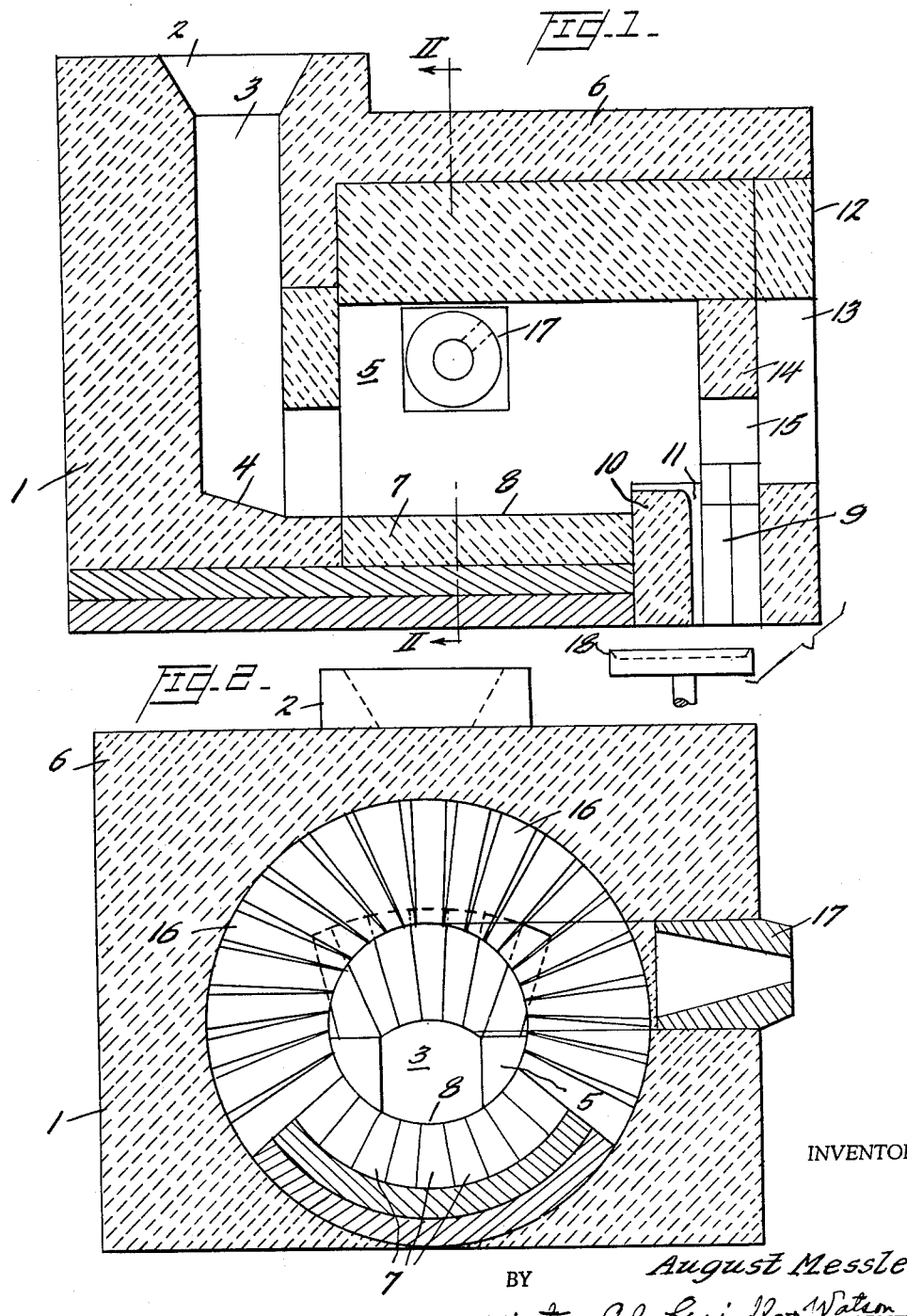

3,145,981
FURNACES FOR THE PRODUCTION OF MINERAL, ESPECIALLY BASALT WOOL
August Messler, Volkach (Main), Germany
Filed Jan. 22, 1960, Ser. No. 4,024
2 Claims. (Cl. 263—27)

This application is a continuation-in-part of application Serial No. 660,267, filed May 20, 1957, and now abandoned.

The invention relates to a furnace for the production of mineral and especially basalt wool with a continuous working process.

In the production of glass or slag wool, furnaces have already become known for smelting minerals, which continually melt the raw material and catch the melt in a trough located in the furnace.

For melting basalt rock and attaining the degree of plasticity of the melt which is necessary for the production of wool, considerably higher temperatures are required than for the production of glass or slag wool.

Therefore the object of the invention is to produce a furnace which is suitable for melting basalt rock and heating the melt so strongly that it can be drawn into wool.

To attain this object the furnace according to the invention is constructed so that it has a vertical charging hopper which at its lower end merges into a horizontal collecting trough for the molten material arranged in the housing of the furnace.

At the same time it is advantageous to provide the edge of the trough opposite the charging hopper with a discharge aperture through which the melt flows off into the blast passage. The blast passage is at the same time preferably arranged vertically above the centrifugal disc for the production of the wool.

According to another feature of the invention, the furnace chamber is almost circular in cross-section above the collecting trough. This construction presents the advantage that only one burner is necessary for melting the rock and producing the necessary flame pressure in the blast passage. This burner is, according to the invention, arranged tangentially to the furnace chamber above the collecting trough. Because thereby the advantage is attained that rotary motion is imparted to the burner flames by the circular shape of the furnace chamber, consequently they creep apart from the burner nozzle in spiral shape to the charging hopper and to the blast passage and thereby brush uniformly the molten material which has been collected in the collecting trough.

Other features and advantages of the invention will become apparent from the following description of an embodiment illustrated diagrammatically by way of example in the accompanying drawing, wherein FIG. 1 is a longitudinal section through the furnace and FIG. 2 a cross-section taken on line II—II of FIG. 1.

The furnace 1 rests on a supporting foundation not shown in the drawing and is substantially of box-shape outside. The admission funnel 2 for the raw material, namely uniformly grained basalt rock, is located at the top. The funnel 2 extends gradually into the vertical charging hopper 3, the bottom 4 of which slopes downwards towards the furnace chamber 5. The charging hopper wall is preferably of refractory material like the outer wall 6 of the furnace. On the bottom 7 of the substantially cylindrical furnace chamber 5 a collecting trough 8 for the molten basal rock is arranged. The bottom 7 is of high-grade fireproof material and the trough 8 is shut off from the blast passage 9 by a stop-wall 10 provided with an overflow channel 13 leading into the blast passage 9. The channel 13 is arranged on the front side 12 and closed by a cover-plate 14 with the exception of a small peephole 15. The plate 14 can easily be removed to enable the wearing parts in the interior of the furnace to be exchanged without difficulty.

The cylindrical furnace chamber 5 is built of arch bricks 16 which are made from wear-resisting, highly refractory material.

In one of the side walls of the furnace chamber an admission mouth 17 is provided for a burner which is not shown in the drawing as it does not form part of the invention. The burner mouth 17 projects tangentially towards the furnace chamber 5.

A furnace according to the invention operates in the following manner:

Broken basalt rock is charged into the charging hopper 3 through the funnel 2. The burner blows its flame into the furnace chamber 5 which, owing to its cylindrical shape, imparts spiral movement to the flame. Part of the flame brushes over the raw material in the charging hopper after brushing the bricks 16. The basalt rock resting on the bottom is melted whereas the raw material in the zones above is sintered, calcined and preheated from the bottom toward the top. The melt produced collects in the trough 8 and when it attains a sufficiently high level, flows along the channel 11 into the blast passage 9.

The molten material in the channel 9 is subjected to the pressure flame of the burner and flung against the rotary disc 18 which draws the drops of basalt into threads.

The melt in the trough 8 as well as the continuously melting raw material in the charging hopper 3 in conjunction with the jacket of the furnace form such a great reserve of heat that no heat shock effects can occur in the interior of the furnace.

I claim:
1. Furnace for the production of mineral and especially basalt wool with continuous melting process, comprising a furnace housing with a collecting trough, a vertical charging hopper merging at its lower end into the collecting trough for the molten material, said trough arranged horizontally in the furnace housing as a circular chamber in vertical cross section, a blast passage provided in the circular chamber at the end of the collecting trough, and a burner opening fitted tangentially in the furnace housing so that a flame from a burner enters the furnace chamber tangentially to melt the raw rock and produce a flame pressure in the blast passage.

2. Furnace for the production of mineral and especially basalt wool with continuous melting process, comprising a furnace housing with a collecting trough, a vertical charging hopper merging at its lower end into the collecting trough for the molten material, said trough arranged horizontally in the furnace housing as a circular chamber in vertical cross section, a blast passage provided in the circular chamber at the end of the collecting trough, and a burner opening in the housing for a burner of which the flame is given a spiral direction towards the charging hopper and the blast passage by the furnace housing which is of substantially circular cross section.

(References on following page)

References Cited in the file of this patent

UNITED STATES PATENTS

| | | | |
|---|---|---|---|
| 165,375 | Shimer et al. | July 6, | 1875 |
| 1,352,912 | Partridge | Sept. 14, | 1920 |
| 1,460,231 | De Thal | June 26, | 1923 |
| 2,165,242 | Drill | July 11, | 1939 |
| 2,194,727 | Vello | Mar. 26, | 1940 |
| 2,226,498 | Koob | Dec. 24, | 1940 |
| 2,234,087 | Rosengarth et al. | Mar. 4, | 1941 |
| 2,450,013 | Nelson | Sept. 28, | 1948 |
| 2,597,585 | Howard | May 20, | 1952 |
| 2,689,433 | Mathews | Sept. 21, | 1954 |
| 2,718,096 | Henry et al. | Sept. 20, | 1955 |

FOREIGN PATENTS

| | | | |
|---|---|---|---|
| 461,125 | Canada | Nov. 15, | 1949 |
| 721,086 | Germany | May 23, | 1942 |